United States Patent

Furlani et al.

[11] Patent Number: 5,861,692
[45] Date of Patent: Jan. 19, 1999

[54] MAGNETICALLY INDUCED COUPLING AND DRIVE APPARATUS

[75] Inventors: Edward P. Furlani, Lancaster; Syamal K. Ghosh; Dilip K. Chatterjee, both of Rochester, all of N.Y.

[73] Assignee: Eastman Kodak Company, Rochester, N.Y.

[21] Appl. No.: 28,553

[22] Filed: Feb. 24, 1998

[51] Int. Cl.⁶ ............................................. H02K 49/06
[52] U.S. Cl. .............................. 310/103; 492/52; 492/53
[58] Field of Search .......................... 310/92, 90.5, 103, 310/114, 115; 74/DIG. 4; 492/52, 53, 54, 58, 59.8; 138/145, 146

[56] References Cited

U.S. PATENT DOCUMENTS

| | | | |
|---|---|---|---|
| 3,149,403 | 9/1964 | Aurich et al. | 492/8 |
| 3,150,419 | 9/1964 | Aurich | 492/8 |
| 3,168,760 | 2/1965 | Olcottt | 492/8 |
| 3,520,747 | 7/1970 | McGaughey | 138/145 |
| 3,864,587 | 2/1975 | Landry | 310/103 |
| 4,069,570 | 1/1978 | Pospisil et al. | 492/54 |
| 5,283,121 | 2/1994 | Bordner | 492/52 |
| 5,387,172 | 2/1995 | Habenicht et al. | 492/50 |
| 5,569,967 | 10/1996 | Rode | 310/103 |
| 5,782,177 | 6/1998 | Rindfleisch | 492/8 |

*Primary Examiner*—Nestor Ramirez
*Assistant Examiner*—Joseph Waks
*Attorney, Agent, or Firm*—Clyde E. Bailey, Sr.

[57] ABSTRACT

A magnetically induced coupling and drive apparatus (10) useful, for instance, for conveying webs utilizes magnetically coupled first and second rotatable elements (20,32) and means for rotating one of the rotatable elements (20, 32) which causes the simultaneous synchronous rotation of the other rotatable element. Both first and second rotatable elements (20, 32) include a magnetic core (22, 34), a bonding layer (28, 36) at least partially surrounding the magnetic core (22, 34), and a wear and abrasion resistant layer (26, 32) surrounding the bonding layer (28, 36). The means for rotating (60) rotating one of the rotatable elements (20, 32) includes a ferromagnetic stator member (62) integrally associated with one of said first and second rotatable elements (28, 36). The ferromagnetic stator member (62) has a plurality of spatially separated pole teeth (64a, 64b, 64c, 64d), wherein each of the pole teeth has an operably connected coil (66a, 66b, 66c, 66d) arranged for producing rotation of one of said first and second rotatable elements (20, 32) once the coil is energized.

17 Claims, 4 Drawing Sheets

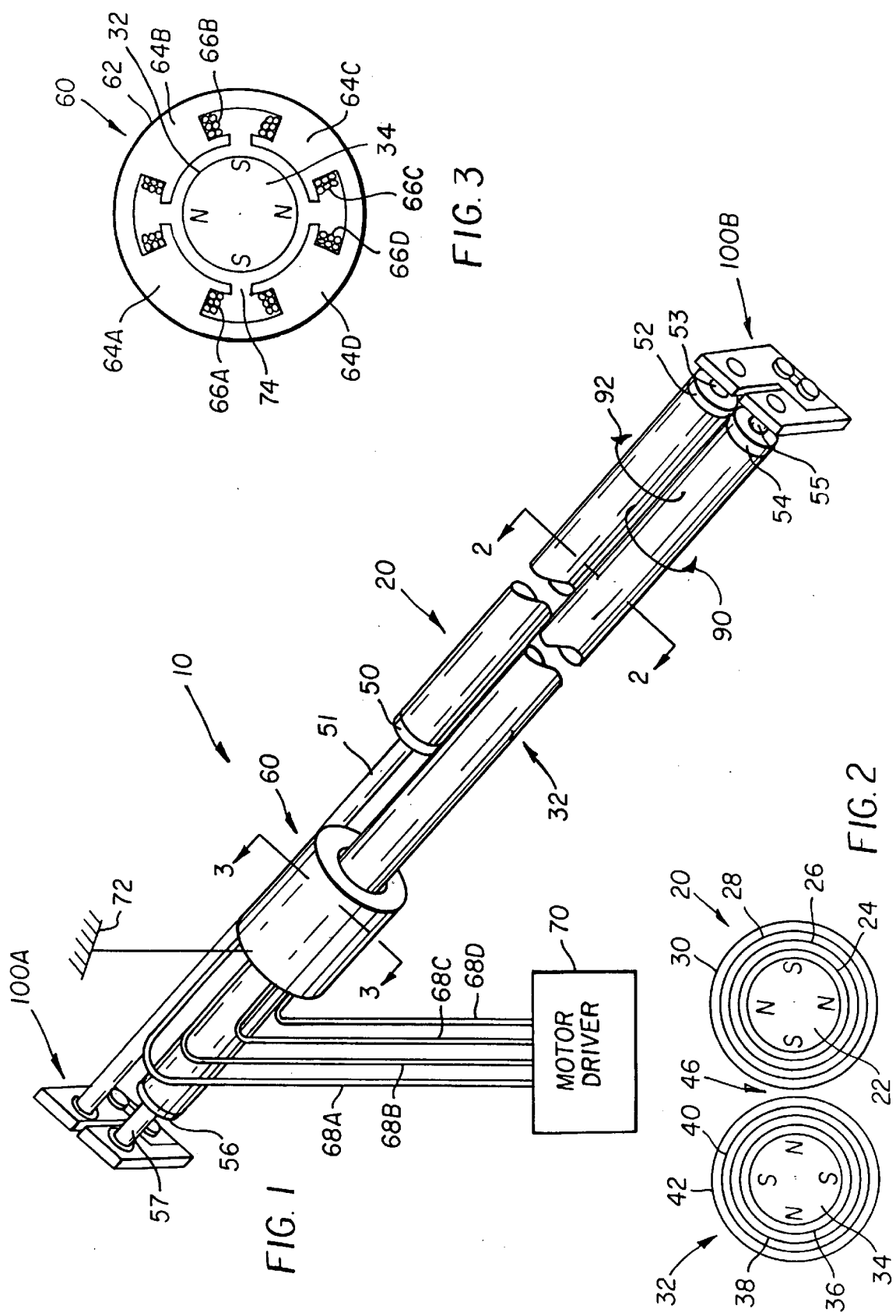

MAGNETICALLY INDUCED COUPLING AND DRIVE APPARATUS

FIELD OF THE INVENTION

The invention relates to a coupling apparatus and, more particularly, the invention concerns a magnetically induced coupling and drive apparatus that utilizes a magnetically induced coupled wear and abrasion resistant roller assemblage useful for conveying photosensitive web of indeterminate length in chemically corrosive environments.

BACKGROUND OF THE INVENTION

In the production of media webs, particularly photosensitive film web, devices that employ mechanically coupled rollers are widely used to convey the web of indeterminate length between a variety of processing stations. More particularly, such apparatus will normally guide and move the web through a processing sequence involving developer, fixer, washing, and drying bathes stations which tend to expose the conveyance rollers of the apparatus to corrosive materials. With mechanically coupled driven rollers of the type presently used in web conveyance equipment, sensitive mechanical gears that synchronize the rotation of the rollers and some sort of drive means, typically a motor, coupled to the rollers for producing the desired rotation may be interrupted if exposed to harmful and deleterious materials.

Hence, it is well known that one major shortcoming of conventional mechanically coupled rollers is that the excessive exposure of the mechanical elements to various corrosive materials will invariably result in degraded mechanical performance. As a consequence, the equipment, and therefore production, must be frequently interrupted for maintenance and parts replacement.

Moreover, during the processing of photosensitive web, experience indicates that the web will invariably tend to show signs of objectionable wear and abrasion as the performance of conventional mechanically coupled conveyance rollers degrade during extensive and continuous exposure to corrosive materials. Hence, degraded rollers and associated web conveyance elements tend to have an adverse effect on the quality of the costly photosensitive web product.

Another well recognized problem associated with conventional web conveyance equipment is that such equipment does not easily accommodate photosensitive film webs having a variety of thickness. In order to accommodate the processing of such film webs (each having a different thickness) enormous downtime and production cost sacrifices are realized so that required adjustments to a transfer nip separating the mechanically coupled rollers can be made. Thus, photosensitive film web processing equipment that utilizes conventional mechanically coupled rollers as a means of conveying the film web through various processing stations require costly and time consuming maintenance and adjustment.

Therefore, a need persists for a magnetically induced coupling and drive apparatus suitable for conveying photosensitive web materials in corrosive environments without the concerns that the equipment will require excessive and costly maintenance as well as will impart harmful defects to the film web. Moreover, there exists a need for such apparatus and method that easily accommodates adjustments for processing webs of different thickness.

SUMMARY OF THE INVENTION

It is, therefore, one object of the invention to provide a magnetically induced coupling and drive apparatus that is particularly suitable for conveying a media web in a corrosive environment without undergoing frequent maintenance and adjustments.

Another object of the invention is to provide a coupling and drive apparatus that employs magnetically driven and coupled rollers capable of conveying a web of media in a corrosive environment.

It is another object of the invention to provide magnetically coupled rollers that are wear and abrasion resistant.

It is a feature of the invention that a magnetically induced coupling and drive apparatus useful for conveying a media web incorporates a pair of conveyance rollers each of which includes a corrosion resistant layer and a wear and abrasion resistant layer surrounding a magnetic core, the magnetic core providing means for magnetically coupling the pair of rollers.

To solve one or more of the problems above, there is provided, in one aspect of the invention, a magnetically induced coupling and drive apparatus comprising magnetically coupled first and second rotatable elements or rollers. First rotatable element has a first magnetic core and a first bonding layer at least partially surrounding and bonded to the first magnetic core. A first layer comprising a corrosion resistant material at least partially surrounds and is bonded to the first bonding layer. Also, a second bonding layer at least partially surrounds and is bonded to the first layer. At least partially surrounding and bonded to the second bonding layer is a second layer comprising a wear and abrasion resistant material.

Similarly, second rotatable element or roller having a second magnetic core for magnetically coupling with the first magnetic core of the first rotatable element includes a third bonding layer that at least partially surrounds and is bonded to the second magnetic core. A third layer comprising a corrosion resistant material at least partially surrounds and is bonded to the third bonding layer. Also, a fourth bonding layer at least partially surrounds and is bonded to the third layer. Over the fourth bonding layer is a fourth layer comprising a wear and abrasion resistant material that at least partially surrounds and is bonded to the core via the fourth bonding layer.

Further, a rigid frame is provided for supporting the first rotatable element in a magnetic coupled relations with the second rotatable element. The first and second rotatable elements supported in the frame have a substantially uniform nip width therebetween for conveying a contacting web therethrough.

Moreover, means is provided for rotating one of the first and second rotatable elements. In our invention, a ferromagnetic stator member is integrally associated with one of the first and second rotatable elements. The stator member has a plurality of spatially separated pole teeth, each pole teeth having an operably connected coil arranged for producing rotation of one of the first and second rotatable elements. A source of energy is provided to energize the coils. Thus when the coils are energized, rotation of either one of the first and second rotatable elements causes rotation of the corresponding magnetic core in the rotated first or second rotatable element. Because the rollers are magnetically coupled via the respective magnetic cores, the other roller will simultaneously and synchronously rotate.

It is, therefore, an advantageous effect of the present invention that the magnetic induced coupling and drive apparatus is useful for conveying a web, such as photosensitive film web, in a corrosive environment without degradation of the conveyance elements. A further advantage of the present invention is that the conveyance elements can be easily adjusted to accommodate webs of different thickness'. An additional advantage of the present invention is that a preselected one of the magnetically coupled elements has the dual function of being an integral part of the drive mechanism thereby reducing the number of parts and thus cost of the apparatus and associated system.

BRIEF DESCRIPTION OF THE DRAWINGS

The above mentioned and other objects, features and advantages of the invention and the manner of attaining them will become more apparent and the invention itself will be better understood by reference to the following description of an embodiment of the invention taken in conjunction with the accompanying drawings, wherein:

FIG. 1 is a perspective view of the apparatus of the present invention;

FIG. 2 is a section view of the rollers taken along line 2—2 of FIG. 1;

FIG. 3 is a section view of a motor drive mechanism taken along line 3—3 of FIG. 1;

DETAILED DESCRIPTION OF THE INVENTION

Figure 6:
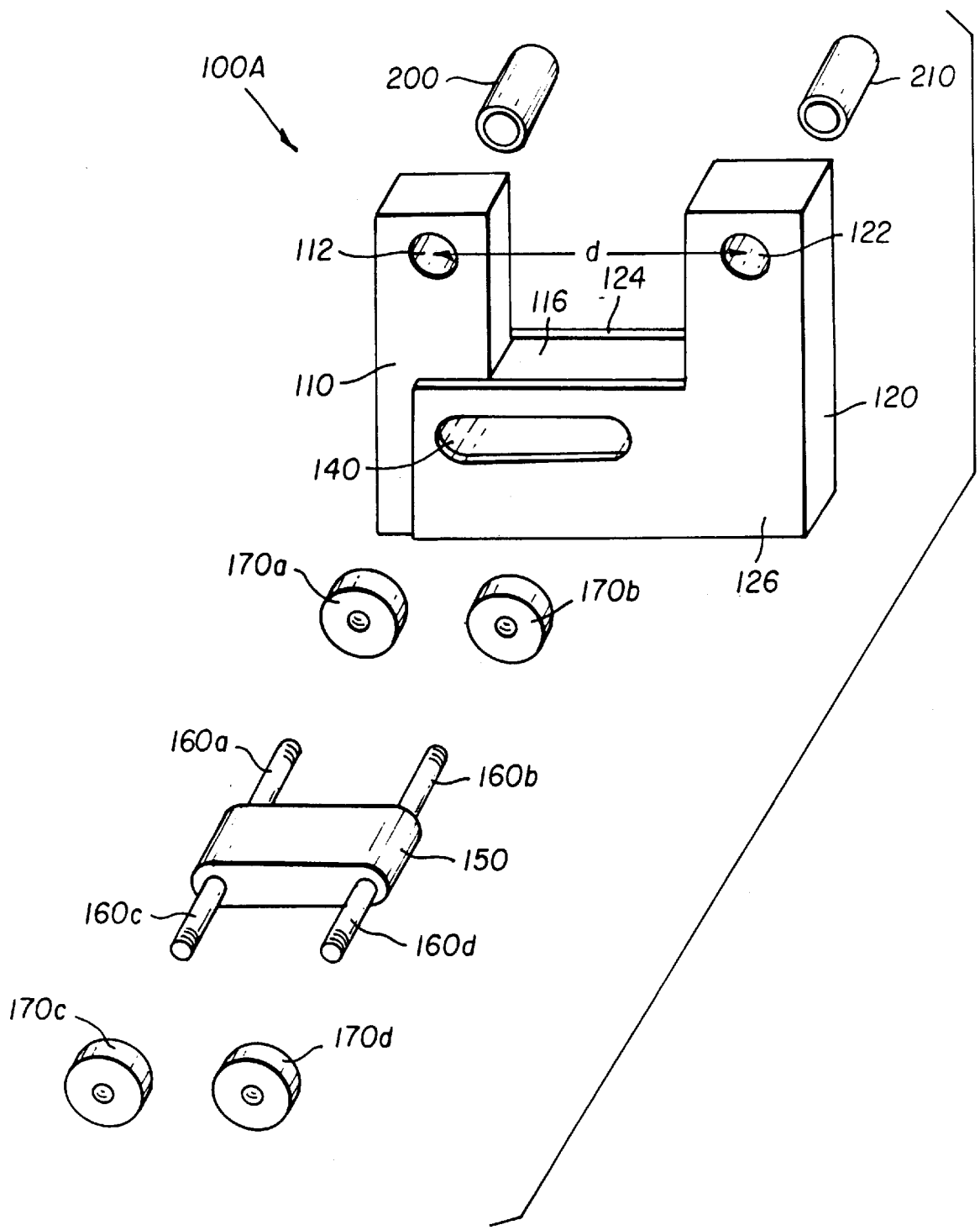
FIG. 6 is an exploded perspective view of the frame assembly with sleeve bearings and threaded insert; and, FIG. 7 is a schematic cross-sectional view of a web conveyance apparatus of the invention.
Figure 7:
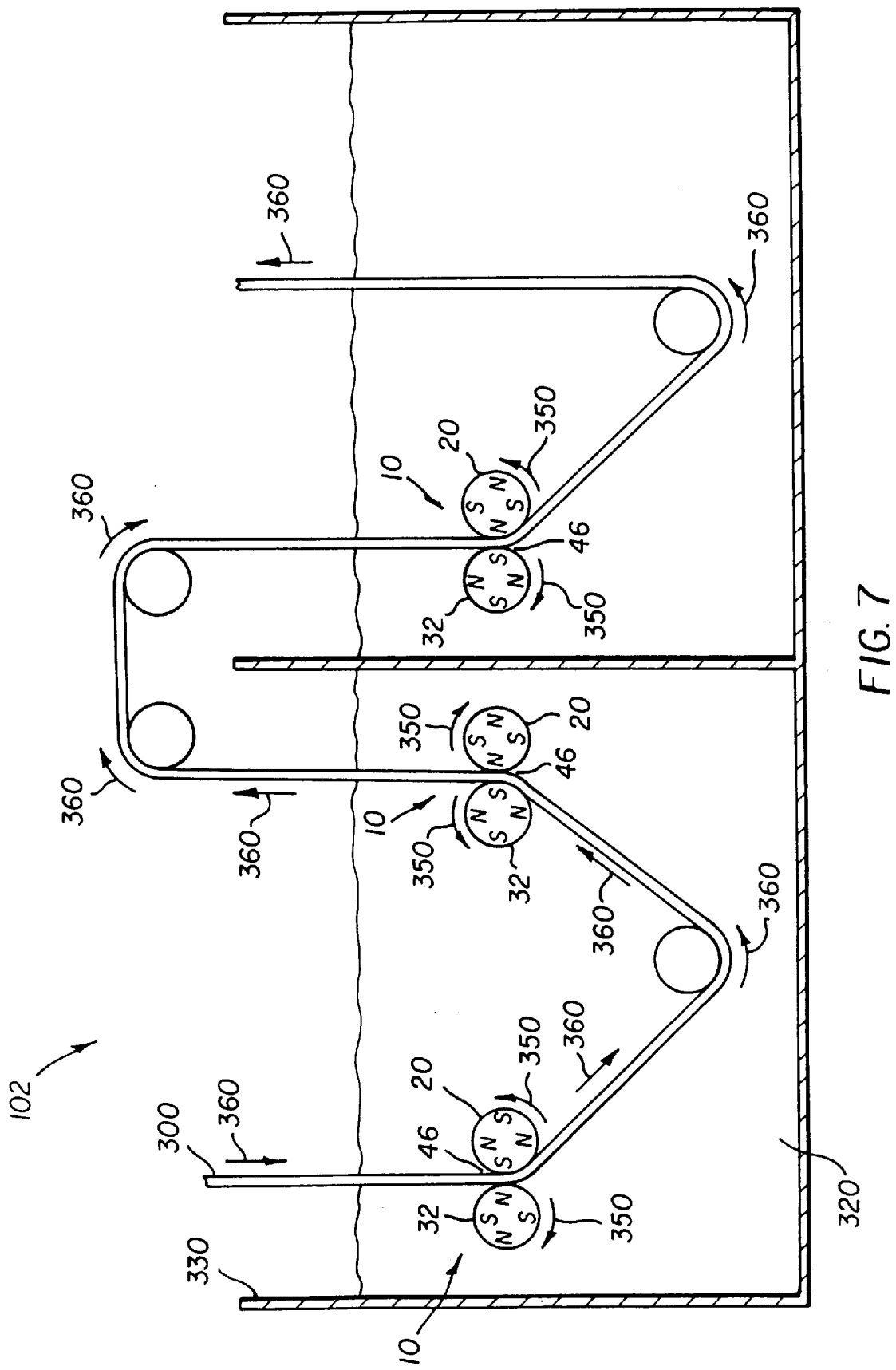

Turning now to the drawings, and particularly to FIGS. 1 and 7, the magnetically induced coupling and drive apparatus 10 according to the principles of the invention is illustrated. As shown in FIG. 1, apparatus 10, broadly defined, includes a first rotatable element or roller 20 magnetically coupled to a second rotatable element or roller 32. Magnetic drive means 60 (described below) which induces the magnetic coupling of the first and second rotatable elements 20, 32 is uniquely integrally associated with one of the first and second rotatable elements 20, 32 in a manner described more fully below. In a preferred embodiment, magnetic drive means 60 is operably associated with second rotatable element 32, as illustrated in FIG. 1. Alternatively, magnetic drive means 60 may be integrally associated first rotatable element 20 with similar results. Frame members 100a, 100b, illustrated in FIGS. 1 and 6, supports the first and second rotatable elements 20, 32 in a magnetically coupled relations, described below.

Referring again to FIG. 1, magnetic drive means 60, more particularly, is fixedly attached to a rigid support element 72. In this way, magnetic drive means 60 is held stationary against any movement relative to the second rotatable element 32. Practically any suitable means of attaching magnetic drive means 60 to support 72 may be used, e.g., bolting. A motor driver 70 (see for instance various motor drivers described in "Permanent Magnets and Brushless DC Motors," by T. Kenjo and S. Nagamori, Oxford University Press, 1984) is operably connected to magnetic drive means 60 via a plurality of conductors 68A, 68B, 68C and 68D. Conductors 68A, 68B, 68C and 68D provide electrical connection between the motor driver 70 and magnetic drive means 60. Therefore, when current is provided from the motor driver 70 it flows through conductors 68A, 68B, 68C and 68D into stator member 62 of magnetic drive means 60 that drives one of the rotatable elements 20, 32.

As shown in FIG. 1, first and second rollers, 20, 32 are mounted for rotational support in opposing frame members 100a and 100b. By precisely positioning rollers 20, 32 in frame members 100a, 100b, a substantially uniform nip 46 (shown in FIGS. 2 and 7) or spacing is formed between the mounted first and second rollers 20, 32 through which a contacting web can be conveyed. According to FIG. 7, rollers 20, 32 may be arranged, for instance, to convey a web 300 of indeterminate length through a series of web processing steps, such as fixing, washing, etc., which exposes the roller elements to corrosive materials.

Turning to FIG. 2, first and second rollers 20, 32 are shown in a cross-sectional view taken along line 2—2 of FIG. 1. As depicted, first and second rollers 20, 32 are spaced slightly apart in frame member 100a forming nip 46 between them so as to accommodate a web of predetermined thickness.

Referring to FIGS. 2 and 3, it is important to our invention that first and second rollers 20, 32 are similarly constructed. In our preferred embodiment of the invention, first and second rollers 20, 32 has first and second magnetic cores 22, 34, respectively. First and second magnetic cores 22, 34 are preferably made from a non rare-earth permanent magnet material such as aluminum-nickel-cobalt, barium-ferrite, copper-nickel-iron alloy, iron-cobalt-molybdenum alloy. Most preferred of the non rare-earth materials is aluminum-nickel-cobalt.

Alternatively, first and second magnetic cores 22, 34 may also be made of a rare-earth material such as neodymium-iron-boron, or samarium-cobalt or a mixture thereof. In this instance, the most preferred material is neodymium-iron-boron manufactured by Magnaquench, Inc., of Indiana.

Referring to FIG. 2, it is also important to our invention that first and second magnetic cores 22, 34 are polarized with a plurality of radially disposed surface poles of alternating polarity around their circumferences. This arrangement of surface poles is required so that a select one of the magnetic cores 22, 34 will function as a motor rotor when the selected magnetic core 22, 34 is in an operable relations with magnetic drive 60. Further, the arrangement of surface poles is required so that magnetic core 22 interacts with magnetic core 34 thereby providing a magnetic coupling between the magnetic cores 22, 34.

Referring again to FIG. 2, first roller 20 further comprises an inner first layer 26 and an outermost second layer 30 which surround the first magnetic core 22. Those skilled in the art will appreciate that first and second layers 26, 30 may be arranged about core 22 in several different ways with similar results. According to our preferred embodiment, first bonding layer 24 is coated onto the first magnetic core 22 using the coating technique described below. First bonding layer 24 is preferably comprised of copper or copper based alloys, chromium, gold, silver and combinations thereof. Most preferred is copper and its alloys.

Skilled artisans will appreciate that first bonding layer 24 may be applied to first magnetic core 22 by using any of several conventional techniques. We, however, prefer depositing first bonding layer 24 onto first magnetic core 22 using physical vapor deposition (PVD), chemical vapor deposition (CVD), or some electroless or electrolytic deposition process, each producing substantially the same result. Preferably, we deposit first bonding layer 24 onto first magnetic core 22 using an electrolytic deposition process. In the preferred embodiment, first bonding layer 24 has a thickness in the range of about 50 to 200 Angstroms, preferably 100 Angstroms.

Referring once again to FIG. 2, after the first bonding layer 24 is bonded to first magnetic core 22, a first layer 26 comprising a corrosion resistant material, is coated onto the first bonding layer 24. First layer 26 comprises preferably a coating of electroplated nickel or electroless nickel. The preferred method for depositing the first layer 26 of corrosion resistant material onto first bonding layer 24 is electroless plating, although other deposition methods may be used. The first bonding layer 24 functions to promote the adhesion of the first layer 26 of corrosion resistant material to the magnetic core 22. Preferably, first layer 26 has a thickness between 0.1 mil and 1 mil, most preferred being 0.5 mil.

According to FIG. 2, a second bonding layer 28 is coated onto first layer 26. The second bonding layer comprises alloys of nickel-aluminum, nickel-chromium, cobalt-chromium-aluminum or combinations thereof. While numerous techniques may be used to deposit the second bonding layer 28, we prefer using a PVD or a plasma spraying. Preferably, the second bonding layer 28 has a thickness in the range of about 1,000 to 10,000 Angstroms, most preferred being 5,000 Angstroms.

Still referring to FIG. 2, a second layer 30 comprising a wear and abrasion resistant material, is coated onto the second bonding layer 28. The second bonding layer 28 enhances the adhesion and minimizes the porosity of the second layer 30 by sealing pores (not shown) in the second layer 30. The preferred method for coating the second layer 30 onto the second bonding layer 28 is by dipping the roller 20 in solutions of polyurethane or acrylic. Alternatively, the second layer 30 may be spin or dip coated onto the second bonding layer 28 of first roller 20 in a solution of sol-gel comprising silicon dioxide or alumina. Yet another acceptable technique for coating the second layer 30 onto the second bonding layer 28 is thermal or plasma spraying with a wear and abrasion resistant material such as chromium oxide, zirconium oxide, aluminum oxide, or composites of zirconia-alumina, or a combination thereof.

Referring again to FIG. 2, the second roller 32 further comprises third and fourth layers 38, 42 which surround the second magnetic core 34. The third and fourth layers 38, 42 comprise the same materials as first and second layers 26, 30 which surround the first magnetic core 22, as described above. Moreover, the third and fourth layers 38, 42 are coated onto the second roller 32 using preferably the same techniques and specifications as described above for coating the first and second layers 26 and 30, respectively, onto first magnetic core 22. It should be clear that third and fourth bonding layers 36, 40 which comprise the same materials as first and second bonding layers 24, 28 promote adhesion of third and fourth layers 38, 42, respectively. In our invention, third and fourth bonding layers 36, 40 are coated onto the second roller 32 using the same techniques and specifications as described above for coating the first and second bonding layers 24, 28, as described above.

Referring now to FIG. 3, magnetic drive means 60 is illustrated in a cross-sectional view taken along line 3—3 in FIG. 1. Magnetic drive means 60 comprises a ferromagnetic stator member 62 with stator pole teeth 64A, 64B, 64C, and 64D and coils 66A, 66B, 66C, and 66D. The ferromagnetic stator member 62 is fixedly attached to support 72 which holds it stationary. The coils 66A, 66B, 66C, and 66D are wrapped around the stator pole teeth 64A, 64B, 64C, and 64D, respectively. Motor driver 70 supplies power to the coils 66A, 66B, 66C, and 66D through conductors 68A, 68B, 68C and 68D, respectively, as shown in FIG. 1.

As depicted in FIG. 3, second roller 32 passes through a central opening 74 in the ferromagnetic stator member 62, as shown. The second magnetic core 34 of second roller 32 functions as the motor rotor, as shown. To cause rotation of the second roller 32, motor driver 70 supplies current through the conductors 68A, 68B, 68C and 68D to the coils 66A, 66B, 66C, and 66D, respectively, in a synchronous fashion thereby creating a magnetic field in the ferromagnetic stator member 62. This magnetic field, in turn, produces a corresponding magnetic field between the neighboring ferromagnetic stator teeth 64A, 64B, 64C, and 64D in a synchronous fashion. Interactions between these magnetic fields produces rotation of second magnetic core 34 of second rotatable element 32 in a manner that is well known in the art. (See for example "Permanent Magnets and Brushless DC Motors," by T. Kenjo and S. Nagamori, Oxford University Press, 1984). It should be clear to those skilled in the art that an important advantage of this integral relationship between stator member 62 and second roller 32 (shown clearly in FIG. 1) is that apparatus 10, and any associated equipment employing the apparatus 10, requires significantly fewer elements and, therefore, is considerably easier to assemble and more cost effective to manufacture.

According to FIG. 1, first and second rotatable elements or rollers, 20, 32 each has end support members 50, 52 and 54, 56, respectively, which are shrunk fit onto end portions of the first and second rollers 20, 32, as described below. The shaft portions 51, 53 and 55, 57 of end support members 50, 52 and 54, 56, respectively, pass through a respective sleeve bearings in frame members 100a and 100b. Thus, first and second rollers 20, 32 are free to rotate about their respective longitudinal axis. When magnetic drive means 60 is energized by the motor driver 70, as described above, it causes rotation of the second roller 32 which, in turn, causes synchronized rotation of the first roller 20 due to their mutual magnetic coupling (see rotation arrows 90, 92). The end support members 50, 52 and 54, 56 are made from AISI 316 stainless steel, wherein the end shaft portions 51, 53 and 55, 57 are electroplated with Teflon™ impregnated nickel so as to reduce the coefficient of friction.

Figure 4:
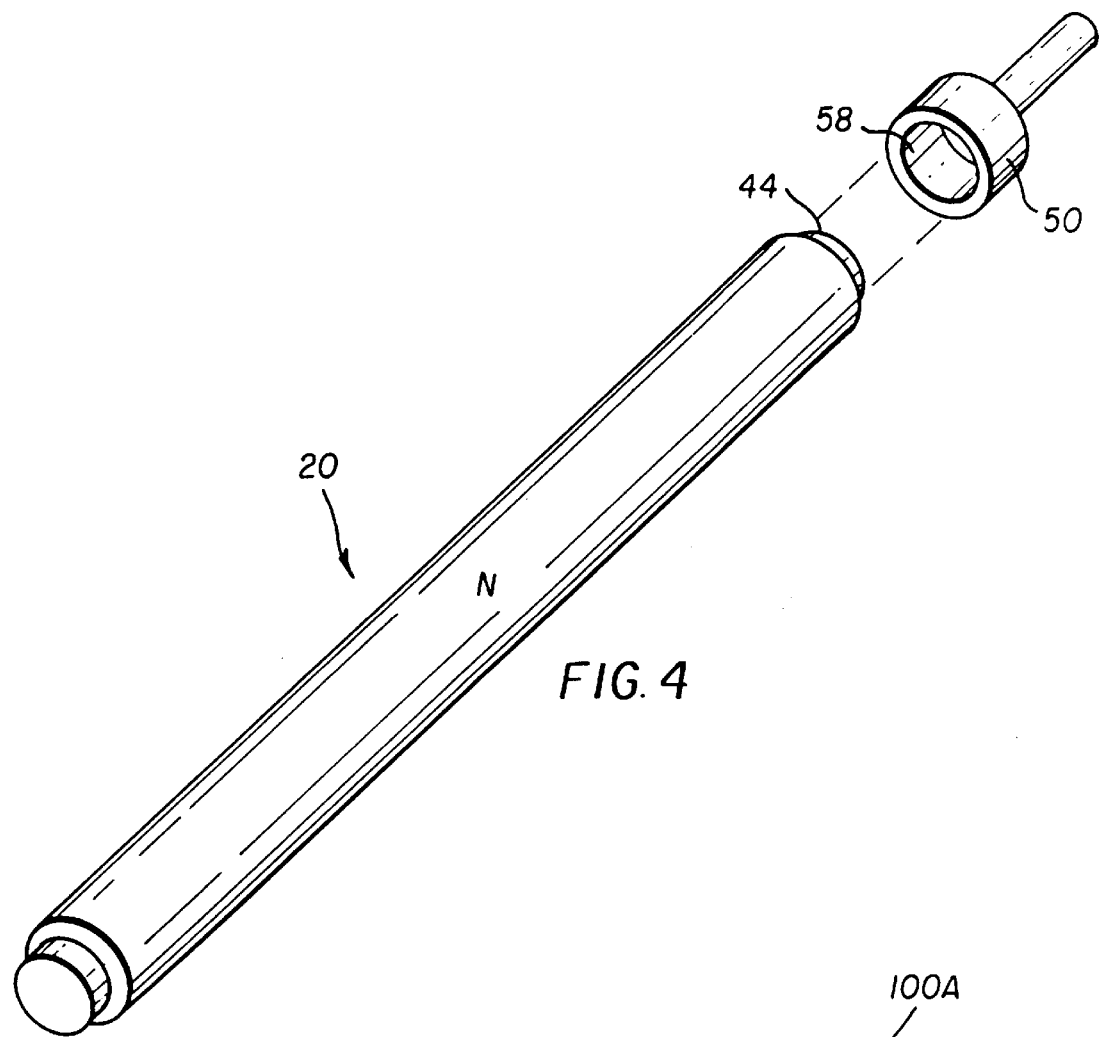
FIG. 4 is a perspective view of the a magnetic roller and end shaft member.

Referring to FIG. 4, a perspective view of the first roller 20 and end support member 50 is depicted. End support member 50 has a cavity 58 for receiving the tapered end 44 of the first roller 20. The end support member 50 is fixedly attached to the end of the first roller 20 by shrink fitting or alternatively by press fitting. The other end support members 52, 54, 56, which are identical to end support member 50, are fixedly attached in a similar fashion to a respective end of the first and second rollers 20, 32, as shown in FIG. 1.

Figure 5:
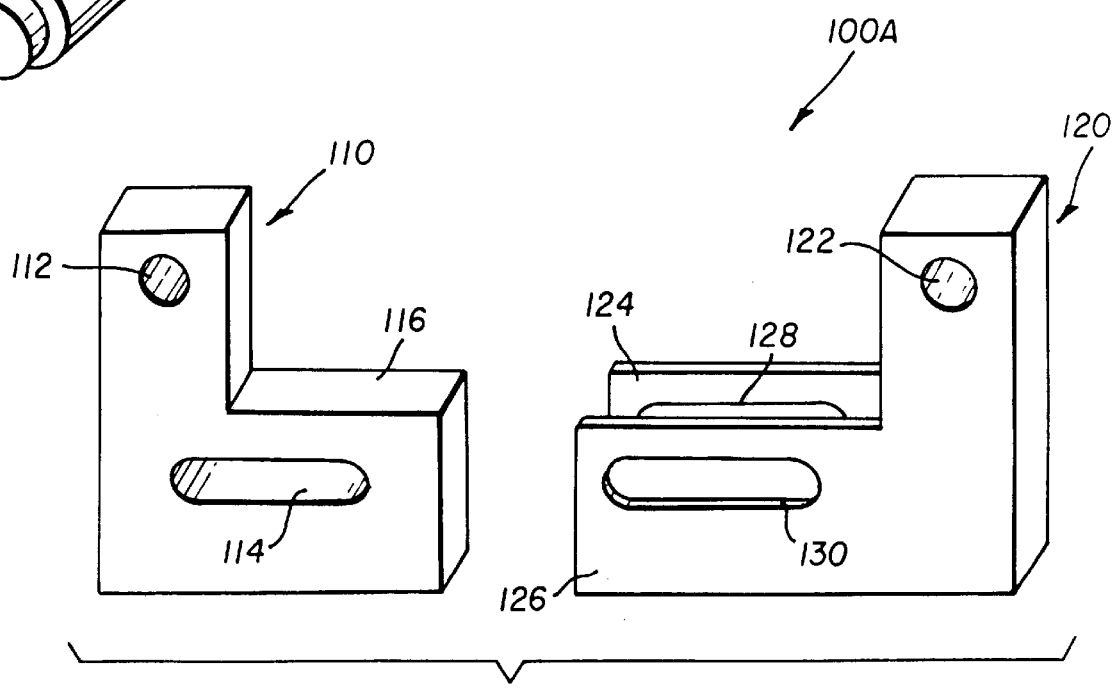
FIG. 5 is a perspective view of the frame.

Depicted in FIG. 5, an exploded view of frame member 100a is illustrated. Frame member 100a comprises a bearing bracket component 110 with a through-hole 112, insert receiving hole 114 and wall 116. Further, frame member 100a has a bearing bracket component 120 with a through-hole 122 and walls 124, 126 with insert receiving holes 128, 130, respectively.

Turning now to FIG. 6, a perspective view of a partially assembled frame member 100a is depicted. As illustrated, bearing bracket component 110 abuts bearing bracket component 120 such that wall 116 of bearing bracket component 110 is between walls 124, 126 of bearing bracket component 120 with insert receiving hole 114 aligned with insert receiving holes 128, 130 forming insert receiving hole 140. Distance (d) between centerlines passing through through-hole 112 of bearing bracket component 110 and through-hole 122 of bearing bracket component 120 is determined by the width of insert 150 which is inserted into the insert hole 140. Thus, insert members of different widths can be used to vary the distance (d) between through-holes 112, 122. The insert member 150 with threaded portions 160a, 160b, 160c, 160d is fixedly attached to assembled frame member 100a. Specifically, insert member 150 is inserted into receiving hole 140 and fixedly attached to frame member 100a by screwing bolts 170a, 170b, 170c, 170d onto threaded portions 160a, 160b, 160c, 160d, respectively. Bearing sleeves 200 and 210 are shrunk fit into through-holes 112, 122, respectively.

Referring to FIG. 7, by way of an example, a schematic cross-sectional view is shown of a web transport system 102 utilizing the magnetic coupling and drive apparatus 10 of the present invention. Web 300 is transported through a corrosive solution 320 in container 330. First and second rollers 20, 32, as described above, rotate as indicated by rotation arrows 350. Further, transport roller system 102 is shown with identical frame members 100a, 100b assembled and adjusted to provide a specific separation between first and second rollers 20, 32. Web 300 passes through the nip 46 formed by the separation between the first and second rollers 20, 32, and is moved via a frictional force as indicated by translation arrows 360.

The invention has thus been described in detail with the particular reference to certain preferred embodiments thereof, but it will be understood that variations and modifications can be effected within the spirit and scope of the invention.

PARTS LIST 10 magnetic coupling and drive apparatus
20 first rotatable element or roller
22 first magnetic core of roller 20
24 first bonding layer of roller 20
26 first layer of roller 20
28 second bonding layer of roller 20
30 second layer of roller 20
32 second rotatable element or roller
34 second magnetic core of roller 32
36 third bonding layer of roller 32
38 third layer of roller 32
40 fourth bonding layer of roller 32
42 fourth layer of roller 32
44 tapered end
46 nip
50 end support member
51 shaft portion
52 end support member
53 shaft portion
54 end support member
55 shaft portion
56 end support member
57 shaft portion
58 cavity
60 magnetic drive means
62 ferromagnetic stator member
64A stator pole tooth
64B stator pole tooth
64C stator pole tooth
64D stator pole tooth
66A coil
66B coil
66C coil
66D coil
68A conductor
68B conductor
68C conductor
68D conductor
70 motor driver
72 support
74 central opening
90 rotation arrow
92 rotation arrow
100a frame member
100b frame member
102 web transport system
110 bearing bracket component
112 through-hole
114 insert receiving hole
116 wall
120 bearing bracket component
122 through-hole
124 wall
126 wall
128 insert receiving hole
130 insert receiving hole
140 insert receiving hole
150 insert
160a threaded portion
160b threaded portion
160c threaded portion
160d threaded portion
170a bolt
170b bolt
170c bolt
170d bolt
200 bearing sleeve
210 bearing sleeve
300 web
320 corrosive solution
330 container
350 rotation arrows
360 translation arrows

What is claimed is:

1. A magnetically induced coupling and drive apparatus useful for conveying webs, comprising:

a first rotatable element having a first magnetic core; a first bonding layer at least partially surrounding and bonded to said first magnetic core; a first layer at least partially surrounding and bonded to said first bonding layer, said first layer comprising a corrosion resistant material; a second bonding layer at least partially surrounding and bonded to said first layer; a second layer at least partially surrounding and bonded to said second bonding layer, said second layer comprising a wear and abrasion resistant material; and, a second rotatable element having a second magnetic core for magnetically coupling with said first magnetic core of said first rotatable element; said second rotatable element further having a third bonding layer at least partially surrounding and bonded to said second magnetic core; a third layer at least partially surrounding and bonded to said third bonding layer, said third layer comprising said corrosion resistant material; a fourth bonding layer at least partially surrounding and bonded to said third layer; a fourth layer at least partially surrounding and bonded to said fourth bonding layer, said fourth layer comprising said wear and abrasion resistant material;

a frame for supporting said first rotatable element in a magnetic coupled relations with said second rotatable element, said first and second elements supported in said frame having a substantially uniform nip width therebetween for conveying a contacting web therethrough; and, means for rotating one of said first and second rotatable elements, said means comprising a ferromagnetic stator member integrally associated with one of said first and second rotatable elements, said ferromagnetic stator member having a plurality of spatially separated pole teeth, each of said pole teeth having an operably connected coil arranged for producing rotation of one of said first and second rotatable elements, said coils being energized by a source of energy, wherein a rotation of either one of said first and second rotatable elements causes rotation of the other one of said first and second magnetic cores corresponding to said either one of said first and second rotatable elements in said magnetically coupled relations, said rotation simultaneously causes a synchronous rotation of the other one of said first and second rotatable elements.

2. The apparatus recited in claim 1 wherein said ferromagnetic stator member is formed from a soft magnetic material selected from the group consisting of: permalloy, supermalloy, sendust, iron, nickel, nickel-iron or alloys thereof.

3. The apparatus recited in claim 1 wherein said ferromagnetic stator member comprises an opening for receiving an end portion of one of said first and second rotatable elements, said ferromagnetic stator member being fixed against movement relative to said one of said first and second rotatable elements.

4. The apparatus recited in claim 1 wherein said first magnetic core is made from a permanent magnet material, said permanent magnet material being polarized with a plurality of radially disposed surface poles of alternating polarity around a circumference of said first magnetic core.

5. The apparatus system recited in claim 4 wherein said permanent magnet material is a rare-earth magnetic material selected from the group consisting of:

(a) neodymium-iron-boron;

(b) samarium-cobalt; and, (c) mixture thereof.

6. The apparatus recited in claim 4 wherein said permanent magnet material is a non rare-earth magnetic material selected from the group consisting of:

(a) aluminum-nickel-cobalt alloys;

(b) barium-ferrite;

(c) copper-nickel-iron alloy;

(d) iron-cobalt-molybdenum alloy; and (e) mixture thereof.

7. The apparatus recited in claim 1, wherein said first bonding layer is selected from the group consisting of: (a) copper; (b) copper based alloys; (c) chromium; (d) gold; (e) silver; and (f) a mixture thereof.

8. The apparatus recited in claim 1, wherein said second bonding layer is selected from the group consisting of: (a) alloys of nickel-aluminum; (b) alloys of nickel-chromium; (c) alloys of cobalt-chromium-aluminum; or a mixture thereof.

9. The apparatus recited in claims 1, wherein said wear and abrasion resistant material is selected from the group consisting of: (a) polyurethane; (b) acrylic; (c)silicon dioxide; (d) alumina; (e) chromium oxide; (f) zirconium oxide; (g) composites of zirconia-alumina; or a mixture thereof.

10. The apparatus recited in claim 1 wherein said second magnetic core is made from a permanent magnet material, said permanent magnet material being polarized with a plurality of radially disposed surface poles of alternating polarity around a circumference of said second magnetic core.

11. The apparatus recited in claim 10 wherein said permanent magnet material is a rare-earth magnetic material selected from the group consisting of:

(a) neodymium-iron-boron;

(b) samarium-cobalt; and, (c) mixture thereof.

12. The apparatus recited in claim 10 wherein said permanent magnet material is a non rare-earth magnetic material selected from the group consisting of:

(a) aluminum-nickel-cobalt alloys;

(b) barium-ferrite;

(c) copper-nickel-iron alloy;

(d) iron-cobalt-molybdenum alloy; and (e) mixture thereof.

13. The apparatus recited in claim 1, wherein said third bonding layer is selected from the group consisting of: (a) copper; (b) copper based alloys; (c) chromium; (d) gold; (e) silver; and (f) a mixture thereof.

14. The apparatus recited in claim 1, wherein said fourth bonding layer is selected from the group consisting of: (a) alloys of nickel-aluminum; (b) alloys of nickel-chromium; (c) alloys of cobalt-chromium-aluminum; or a mixture thereof.

15. The apparatus recited in claim 1, wherein said corrosion resistant material is an electroplated nickel or an electroless nickel.

16. The apparatus recited in claim 1, wherein said wear and abrasion resistant material is selected from the group consisting of: (a) polyurethane; (b) acrylic; (c)silicon dioxide; (d) alumina; (e) chromium oxide; (f) zirconium oxide; (g) composites of zirconia-alumina; or a mixture thereof.

17. The apparatus recited in claim 1, wherein means are provided for adjusting the nip width, said means comprising a pair of slidably adjustable bearing brackets arranged for rotatably supporting either one of said first and second rollers.

* * * * *